(12) United States Patent
Young

(10) Patent No.: US 8,391,496 B2
(45) Date of Patent: Mar. 5, 2013

(54) SMART ENERGY NETWORK CONFIGURATION USING AN AUXILIARY GATEWAY

(75) Inventor: Joel K. Young, Eden Prairie, MN (US)

(73) Assignee: Digi International Inc., Minnetonka, MN (US)

( * ) Notice: Subject to any disclaimer, the term of this patent is extended or adjusted under 35 U.S.C. 154(b) by 302 days.

(21) Appl. No.: 12/792,803

(22) Filed: Jun. 3, 2010

(65) Prior Publication Data

US 2011/0299684 A1 Dec. 8, 2011

(51) Int. Cl.
*H04L 9/08* (2006.01)
*G06F 15/16* (2006.01)
*G06F 15/177* (2006.01)
*G06F 15/173* (2006.01)
*G01R 11/56* (2006.01)
*G01R 21/133* (2006.01)
*G06F 17/00* (2006.01)

(52) U.S. Cl. ........ 380/279; 709/217; 709/219; 709/220; 709/223; 709/225; 705/412

(58) Field of Classification Search .......... 380/277–279; 709/217, 219, 220, 222, 223, 225; 705/412
See application file for complete search history.

(56) References Cited

U.S. PATENT DOCUMENTS

| | | | |
|---|---|---|---|
| 6,766,160 B1 * | 7/2004 | Lemilainen et al. | 455/411 |
| 7,486,648 B1 | 2/2009 | Baranowski | |
| 2004/0212500 A1 | 10/2004 | Stilp | |
| 2004/0235468 A1 | 11/2004 | Luebke et al. | |
| 2005/0271128 A1 | 12/2005 | Williams et al. | |
| 2007/0197262 A1 | 8/2007 | Smith et al. | |
| 2008/0263647 A1 * | 10/2008 | Barnett et al. | 726/6 |
| 2009/0089577 A1 * | 4/2009 | Shon et al. | 713/160 |
| 2009/0135836 A1 * | 5/2009 | Veillette | 370/400 |
| 2009/0177889 A1 * | 7/2009 | Sung et al. | 713/171 |
| 2010/0183152 A1 * | 7/2010 | Hubner et al. | 380/270 |
| 2010/0312430 A1 * | 12/2010 | Troncoso et al. | 701/29 |
| 2011/0029778 A1 * | 2/2011 | Garcia Morchon et al. | 713/171 |
| 2011/0033054 A1 * | 2/2011 | Garcia morchon et al. | 380/279 |
| 2011/0202194 A1 * | 8/2011 | Kobraei et al. | 700/295 |
| 2011/0202195 A1 * | 8/2011 | Finch et al. | 700/295 |
| 2011/0202196 A1 * | 8/2011 | Venkatakrishnan et al. | 700/295 |
| 2011/0202198 A1 * | 8/2011 | Venkatakrishnan et al. | 700/296 |

(Continued)

OTHER PUBLICATIONS

ZigBee Smart Energy Profile Specification. Dec. 1, 2008. p. 1-244.*
Robert Cragie. ZigBee Security. 2009. p. 1-20.*

*Primary Examiner* — Christian Laforgia
(74) *Attorney, Agent, or Firm* — Fogg & Powers LLC

(57) ABSTRACT

Various embodiments include a method and system for configuring a smart energy network using an auxiliary gateway where an auxiliary gateway is capable of communicating with an energy services interface and a link key database. The auxiliary gateway, on a smart energy network, extracts the unique identifier from a communication related to the smart energy device. The auxiliary gateway may then use the unique identifier to retrieve the smart energy device information from the link key database and communicate the smart energy device information to the energy services interface. The energy services interface may then use the smart energy device information to decrypt a communication from the smart energy device or access manufacturer specific functionality of the smart energy device.

22 Claims, 5 Drawing Sheets

U.S. PATENT DOCUMENTS

| | | | |
|---|---|---|---|
| 2011/0202293 A1* | 8/2011 | Kobraei et al. | 702/62 |
| 2011/0202783 A1* | 8/2011 | Venkatakrishnan et al. | 713/340 |
| 2011/0202910 A1* | 8/2011 | Venkatakrishnan et al. | 717/171 |
| 2011/0302190 A1* | 12/2011 | Young | 707/769 |
| 2011/0314163 A1* | 12/2011 | Borins et al. | 709/227 |
| 2012/0124367 A1* | 5/2012 | Ota et al. | 713/153 |

* cited by examiner

SMART ENERGY NETWORK CONFIGURATION USING AN AUXILIARY GATEWAY

TECHNICAL FIELD

This document pertains generally to energy monitoring devices, and more particularly, but not by way of limitation, to smart energy network configuration using an auxiliary gateway.

BACKGROUND

Smart energy ("SE") devices and networks have been deployed in homes and businesses as utilities and consumers attempt to better understand and control energy use. SE networks are typically a collection of monitoring, control, and reporting devices located, for example, in a home. Typical SE devices include, for example, thermostats and water, gas, and electric meters. The SE devices generally implement one or more communications protocols to communicate with each other and ultimately the utility or consumer.

In order to safeguard utilities from incidental or malicious interference from SE networks, SE networks and SE devices are secured using various methods. One such method is to encrypt communications between the SE devices on a SE network. Typically, SE devices are preconfigured, by the manufacturer, with a symmetric cipher key, called a link key, to encrypt the SE device's communications until another key used by the SE network, often called a NetKey, can be given to the SE device after it joins the SE network. The ESI may also be mandated by an interested entity, such as a utility company, for operational reasons including security concerns.

A smart energy device joins the smart energy network through an energy services interface ("ESI"), which may also be known as an energy services portal ("ESP"), the ESI also communicating with a utilities' automated metering infrastructure ("AMI") network. In order for the ESI to join a SE device to the SE network, the ESI needs to be configured with, at least, the SE device's link key. Typically this process is done by a human installer of the SE device. The installer may determine the SE device's information from the product packaging. The installer may then connect to the AMI network and input the SE device information for the given SE network which is typically identified by an ESI for the SE network. Typically, the AMI network may then push the SE device information down to the ESI. Then the installer activates the SE device which begins the joining process. For drivers specific to the SE device, the installer may also need to load these to the ESI in a manner similar to configuring the link key. This cumbersome process is then repeated for each SE device added to the SE network.

OVERVIEW

In systems having an auxiliary gateway coupled to an ESI, a SE device, and a link key database, it can be advantageous for the auxiliary gateway to use the link key database to obtain SE device information and communicate that information to the ESI allowing the SE network to be configured with minimal intervention by the human installer. The auxiliary gateway, or ESI, may extract a unique identifier for the SE device from a SE device communication allowing the auxiliary gateway to lookup the SE device's link key, or other SE device information, from the link key database obviating the need for a human installer to manually enter possibly long and complicated information. This document provides numerous examples in the detailed description, an overview of which is provided here.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In order to join and utilize smart energy ("SE") devices attached to a SE network, an energy services interface ("ESI") may require information about the SE device. Alternatively, if an energy services portal ("ESP") is used instead of, or in addition to, an ESI, the ESP may also require the SE device information. However, for the purposes described herein, an ESP is equivalent to an ESI and so only ESIs will be discussed even though the material is equally applicable to ESPs.

It may be advantageous to store the SE device information in a link key database and associate the information with a unique identifier for the SE device. Additionally, the auxiliary gateway may automatically identify and retrieve the SE device information from the link key database by extracting the unique identifier from a communication with the SE device, whether or not the communication is encrypted. Once the auxiliary gateway has the information, which may, for example, include a link key, driver, or other information for the SE device, the auxiliary gateway may be able to communicate the information to an ESI. The ESI may then decrypt SE device communications and join the SE device to the SE network, or support extended features of the SE device through a driver which may also be known as manufacturer specific profile ("MSP") extensions. In some embodiments the auxiliary gateway may perform as a second ESI. In some embodiments the link key database may be pre-populated with information from the SE device manufacturer and the human installer's participation is limited to physically installing the SE device and activating it, obviating the need for the previously cumbersome process of manually inputting information for each SE device added to the SE network.

Figure 1:
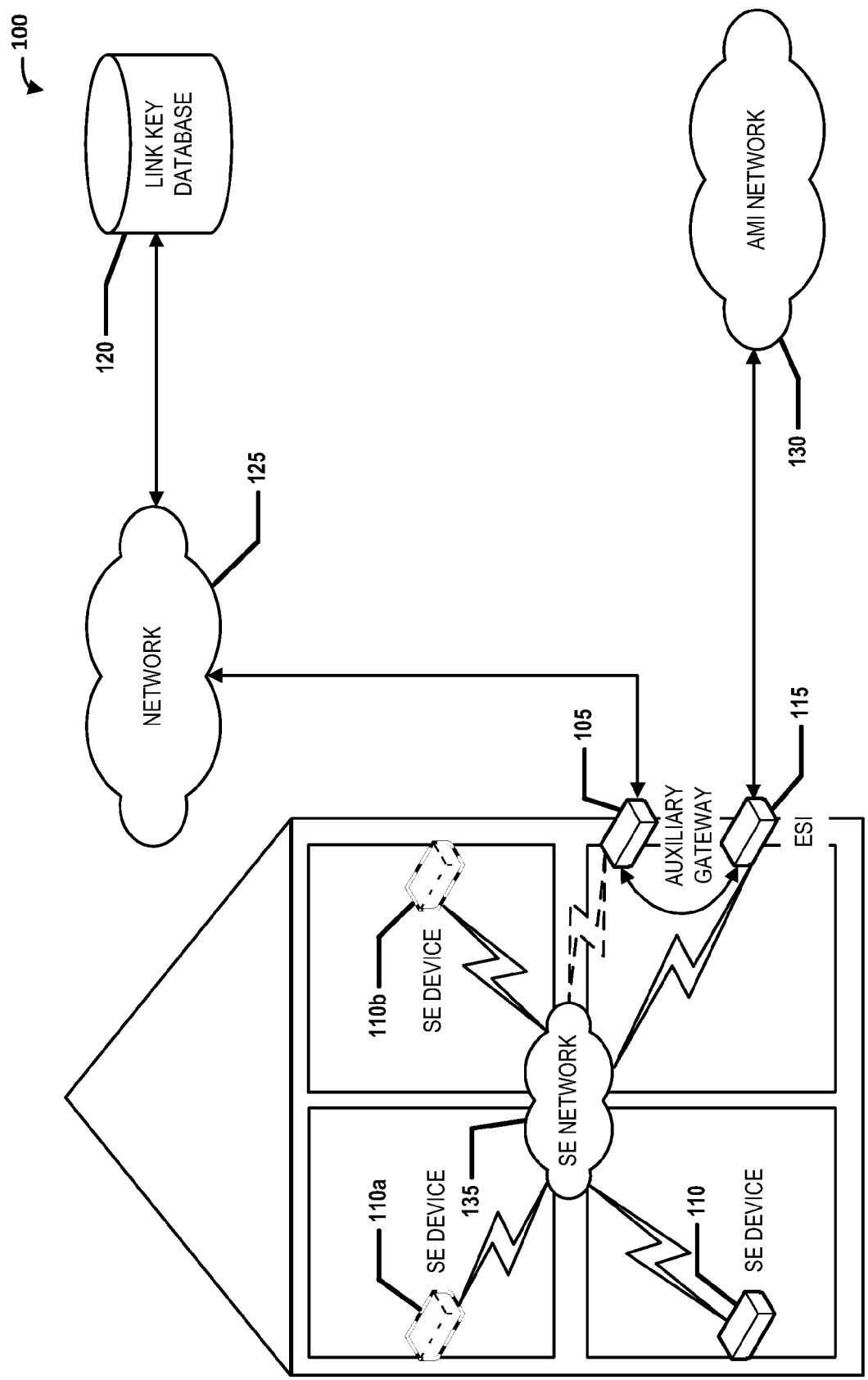
FIG. 1 illustrates an example system to configure a smart energy network using an auxiliary gateway.

FIG. 1 illustrates an example system 100 to configure a smart energy ("SE") network using an auxiliary gateway. An auxiliary gateway 105 may be communicatively coupled to an energy services interface ("ESI") 115 and also communicatively coupled, through network 125, a link key database 120. In some embodiments the auxiliary gateway 105 may also be communicatively coupled to a SE device 110 through an SE network 135. The SE device 110 may be communicatively coupled to the ESI 115 through the SE network 135. In some embodiments the SE network 135 may be comprised of the ESI 115, the auxiliary gateway 105, the SE device 110, and possibly more SE devices or SE network components, such as SE device 110*a* and SE device 110*b*. The ESI 115 may be communicatively coupled to an automated monitoring infrastructure ("AMI") network 130. In some embodiments the auxiliary gateway 105 may also be communicatively coupled to the AMI network 130. In one embodiment, network 125 and AMI network 130 may include some of the same network infrastructure.

The SE device 110 may have a link key configured by its manufacturer. Upon activation by a human installer, the SE device 110 may attempt to join the SE network 135 through the ESI 115 using its link key to encrypt the communication. In various embodiments the connection attempt may entail sending a beacon or broadcast that may be intercepted by a device on the SE network 135. In various embodiments the SE device 110 may be connected to other SE devices, one or more ESIs 105, the auxiliary gateway 105, or other devices on the SE network 135 by, for example, a wireless or wired network. The network may be a traditional hub and spoke network or a mesh network. In various embodiments a portion of the encrypted communication may be unencrypted, such as the packet or frame headers at various levels in the communication stack. In various embodiments the unencrypted portion of the communication may contain a unique identifier for the SE device 110, such as, for example, a media access control ("MAC") address for the SE device 110. In various embodiments the SE device 110 may be one among many SE devices on the SE network 135. In various embodiments the SE device 110 may be, for example, a thermostat or a gas, water, or an electric meter. It will be understood that the SE device 110 may be any number of device types used to support the monitoring and control of resource utilization by a SE network 135.

The ESI 115 may mediate between the SE network 135 and external entities, such as an AMI network 130 for a utility. In various embodiments the ESI 115 may connect to the AMI network 130 through various mechanisms including, but not limited to, wired and wireless connections using proprietary communications protocols for a utility, or through other communications protocols such as, for example, various cellular network protocols. The ESI 115 may be configured to decrypt the SE device's 110 encrypted communication to join the SE network 135 when the ESI 115 can associated the SE device 110 with the SE Device's 110 link key. Further, the ESI 115 may communicate with the SE device to complete the joining process. In various embodiments the ESI 115 may include drivers, or manufacturer specific profile ("MSP") extensions, for a number of devices connected to the SE network 135. In some embodiments the ESI 115 may include a driver for the auxiliary gateway 105. In various embodiments the ESI 115 receives a link key and driver for the auxiliary gateway 105 through the AMI network 130, and joins the auxiliary gateway 105 to the SE network 135.

In various embodiments the ESI 115 may be a stand-alone device. In other embodiments the ESI 115 may be integrated into a SE device 110, such as a meter. In still other embodiments, the ESI 115 may be integrated with another device on the SE network 135, such as, for example, a network gateway.

The auxiliary gateway 105 may receive the communication from the SE device 110 to join the SE network 135. In other embodiments the ESI 115 may receive the communication and make a request of the auxiliary gateway 105 related to the communication. If the auxiliary gateway 105 receives the communication directly it may be configured to determine the unique identifier for the SE device 110 by extracting it from the communication. When the communication is encrypted, the auxiliary gateway 115 may be able to extract the unique identifier from an unencrypted portion of the communication. For example, the auxiliary gateway 105 may read an IEEE 802.11 frame header to get the MAC address for the SE device 105 while the payload is encrypted with the link key. It will be understood that many networking protocols maintain unencrypted portions of encrypted communications often for device addressing reasons. In another embodiment, if the SE device's 110 communication was not directly received by the auxiliary gateway 105, the auxiliary gateway 105 may be able to determine the unique identifier by reading it from the received communication. For example, if the ESI 115 made a request of the auxiliary gateway with respect to the SE device 110, then the request may have a field populated by the unique identifier. In various embodiments the auxiliary gateway 105 continuously or continually monitors the SE network 135 for new SE devices and SE device 110 communications. In other embodiments the ESI 115 continuously or continually monitors the SE network 135 for new SE devices and SE device 110 communications.

After determining the SE device's 110 unique identifier, the auxiliary gateway 105 may be configured to communicate the unique identifier to the link key database 120 and receive the link key associated with the SE device 110. In various embodiments the auxiliary gateway 105 couples to the link key database 120 through network 125. In various embodiments the auxiliary gateway 105 may connect to network 125 or the link key database 120 through a wired or wireless network. For example, the auxiliary gateway 105 may connect to network 125 using a cellular carrier. In another example, the auxiliary gateway 105 may be connected to the internet via a hardwired connection or a wireless connection at the SE network 135 site, coupling to network 125 through the internet.

After receiving the link key, the auxiliary gateway 105 may be configured to communicate the unique identifier and link key associated with the SE device 110 to the ESI 115. In some embodiments the communication is facilitated by a driver for the auxiliary gateway 105 configured on the ESI 115. For example, the driver may define a notification and delivery mechanism to allow the ESI 115 to understand and accept the SE device's 110 link key from the auxiliary gateway 105. In another example, the driver may cause the ESI 115 to poll the auxiliary gateway 105 for new link keys. In various embodiments the ESI 115 may initially receive the SE device's 110 communication and forward it to the auxiliary gateway 105 because of, or using, the auxiliary gateway 105 driver.

In various embodiments the auxiliary gateway 115 may perform as a second ESI. For example, the auxiliary gateway 115 may use the link key to decrypt the SE device's 110 encrypted communication to join the SE network 135 and complete the joining process with the SE device 110. The auxiliary gateway 105 may also couple to the AMI network 130 to mediate between the SE network 135 and other parties in a manner similar to that previously describe with respect to the ESI 115.

In various embodiments the auxiliary gateway 105 may be a stand-alone device. In other embodiments the auxiliary gateway 105 may be integrated into the SE device 110. For example, if the SE device 110 is a water meter, the auxiliary gateway may be included with the meter, either in the meter's packaging or integrated into its hardware and software. In still other embodiments, the auxiliary gateway 105 may be integrated with another device on the SE network 135, such as, for example, a network gateway or the ESI 115.

The link key database 120 may be pre-configured with information about the SE device 110. In various embodiments the SE device 110 information is mapped to the unique identifier for the SE device 110. In various embodiments the SE device 110 information may be added to the link key database 120 at any time. The link key database 120 may be any type of database capable of storing an association between the unique identifier and link key, or other information, for a SE device 110, including, for example, a relational database management system ("RDBMS"), a hierarchical database system, or a file system.

Figure 2:
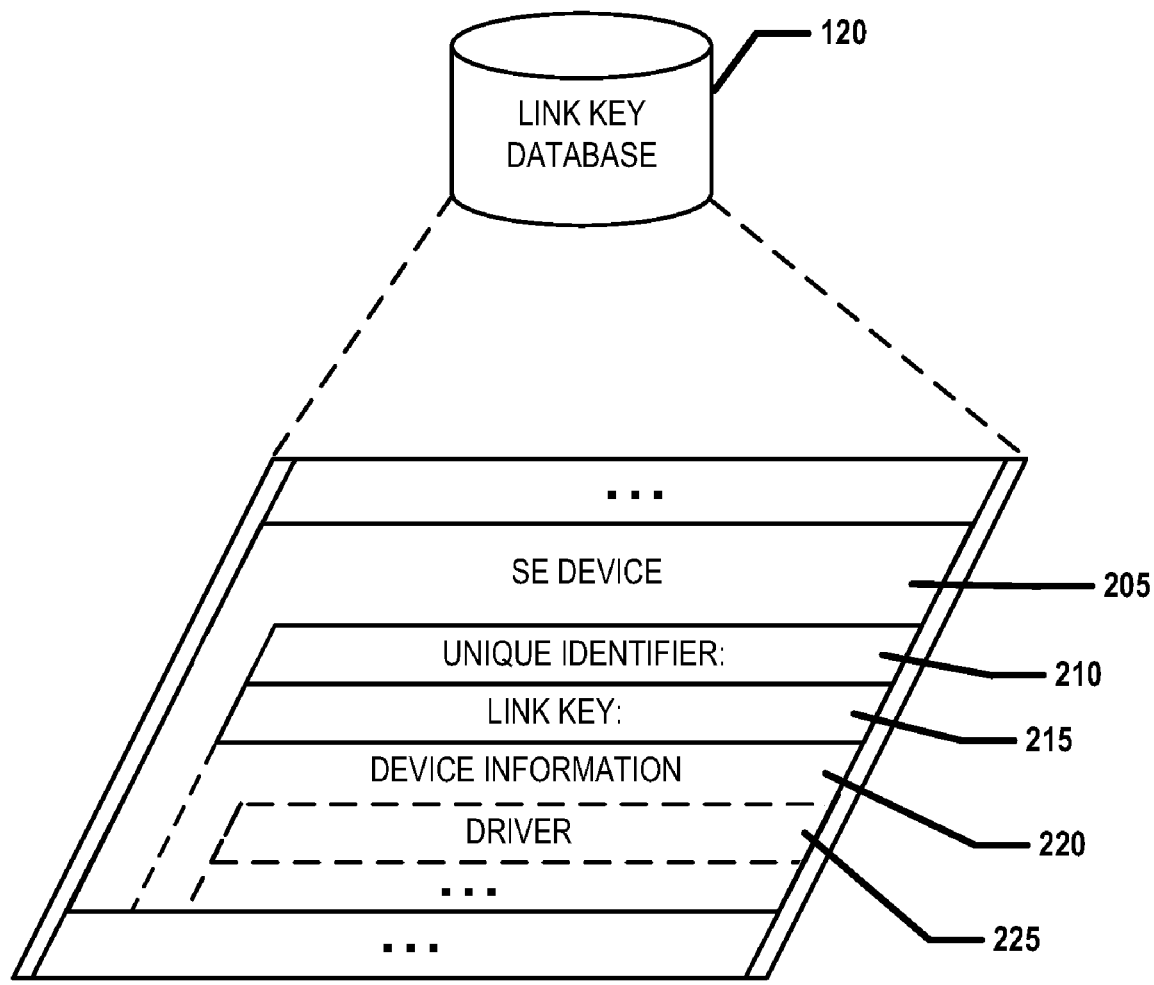
FIG. 2 illustrates a block diagram of link key database contents for a given smart energy device.

FIG. 2 illustrates a block diagram of the link key database 120 contents for the given SE device 110. The diagram logically illustrates the collection of SE device information 205 stored by the link key database 120 for a given SE device 110 and is not necessarily representative of the actual format used to store the information. For example, if the link key database 120 is a RDBMS, one table may store the unique identifier 210 and link key 215 while one or more other tables store other device information 220, such as a driver 225 for the SE device 110.

SE device information 205 may include the unique identifier 210 and the link key 215 for a SE device 110, i.e., the link key 215 may be mapped to the unique identifier 210. In other embodiments, the SE device information 205 may include additional device information 220 mapped to the unique identifier 210. In some embodiments the additional device information 220 may include a driver 225 for the SE device 110, where the driver 225 may be known as MSP extensions for the SE device 110.

Figure 3:
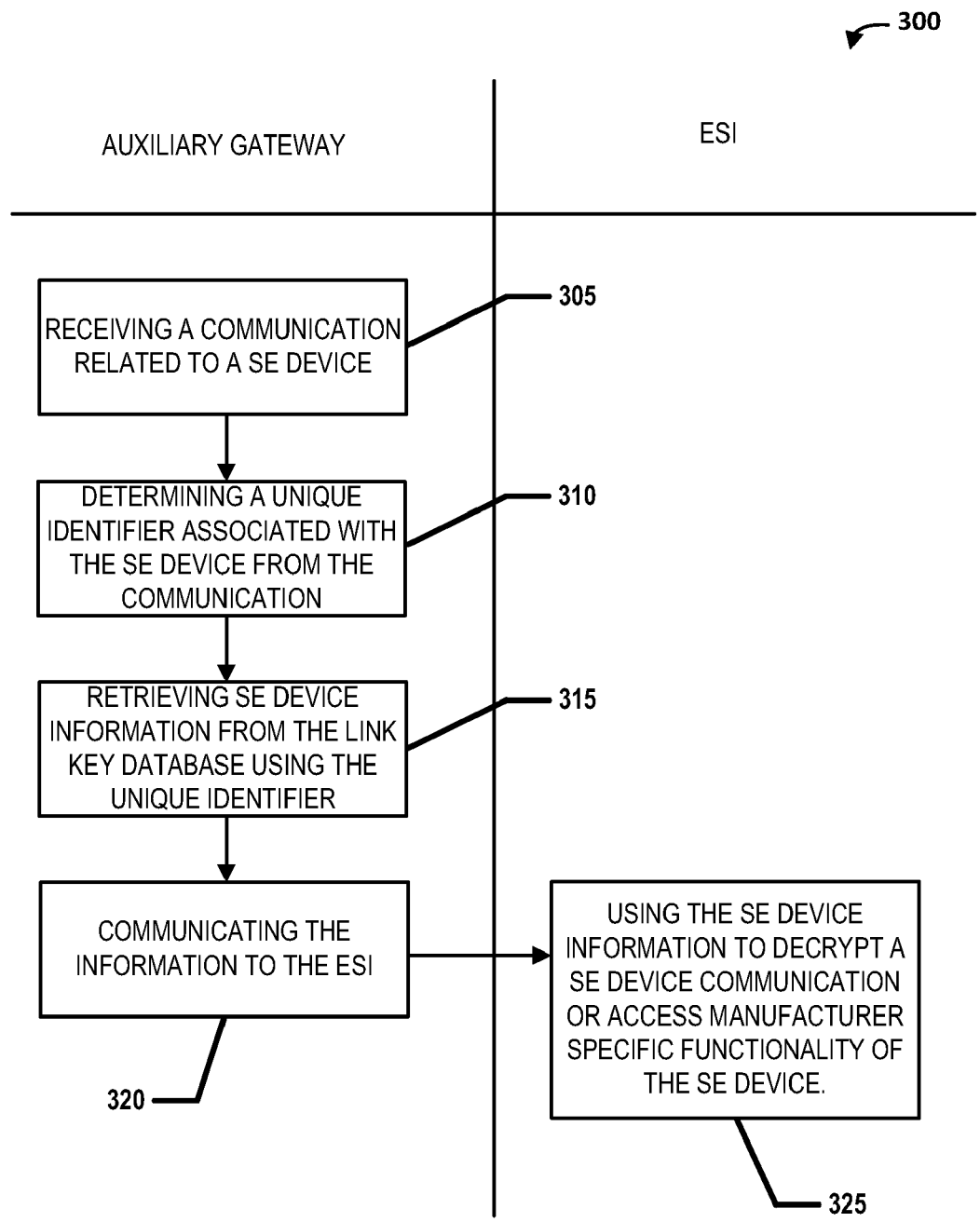
FIG. 3 illustrates a swim-lane flowchart for an example method to configure a smart energy network using an auxiliary gateway.

FIG. 3 illustrates a swim-lane flowchart for an example method to configure a smart energy network using an auxiliary gateway. Various components from system 100, shown in FIG. 1, may be used to implement the method 300 and components from system 100 are used here for illustrative purposes.

At 305 the auxiliary gateway 105 may receive a communication related to a SE device 110. The received communication may be a communication from the SE device 110 to, for example, join a SE network 135. In other embodiments the received communication may originate from the ESI 115 and may be, for example, a request for the SE device's 110 link key 215 or other SE device information 220.

At 310 the auxiliary gateway 105 may determine the unique identifier 210 associated with the SE device 110 from the received communication. In various embodiments, when the communication originates from the SE device 110, the auxiliary gateway 105 may determine the unique identifier 210 by extracting it from the communication. If the communication is encrypted, the unique identifier may be extracted from an unencrypted portion of the communication. For example, the SE device's 110 MAC address may be read from an IEEE 802.11 frame header while the payload is encrypted. In some embodiments the received communication may come directly from the SE device 110. In other embodiments the received communication may be forwarded to the auxiliary gateway 105 by an intermediary device.

In some embodiments the received communication originates from the ESI 115, or other device on the SE network 135. The ESI 115 may have received a communication from the SE device 110 and request the auxiliary gateway to perform some action associated with the SE device 110 communication. The auxiliary gateway 105 may determined the unique identifier 210 by reading a portion of the request. For example, if the request was for the SE device's 110 link key 215, the request may contain a field populated by the unique identifier 210 that the auxiliary gateway 105 may read.

At 315 the auxiliary gateway 105 may retrieve information 205 associated with the SE device 110 from the link key database 120 using the unique identifier 210. For example, the auxiliary gateway 105 may query the link key database 120 for SE device information 220, like a driver 225, associated with the link key 215.

At 320 the auxiliary gateway 105 may communicate the retrieved information 205 to the ESI 115. In various embodiments the auxiliary gateway may push the information 205 to the ESI 115. In other embodiments the ESI 115 may pull the information 205 from the auxiliary gateway 105. In still other embodiments the auxiliary gateway 105 may notify the ESI 115 that the information 205 is available and the ESI 115 may then retrieve it.

At 325 the ESI 115 may use the information 205, such as a link key 215, to decrypt an encrypted SE device 110 communication to, for example, join the SE network 135. In some embodiments the ESI 115 may use the information 205, such as a driver 225 for the SE device 110, to access manufacturer specific functionality of the SE device 110. Manufacturer specific functionality may be functionality of the SE device 110 above and beyond the standard interface for a device of the same type; i.e., extended functionality. For example, if the SE device 110 is a thermometer that both reports temperature information and humidity information, the standard interface to a thermometer may only permit retrieving the temperature information, thus make the humidity reporting function extended, or manufacturer specific, functionality. In some embodiments the manufacturer specific functionality may be MSP extensions. The ESI 115 may be considered configured with respect to the SE device 110 once it receives and uses the information 205. In some embodiments, after the ESI 115 is configured with respect to the SE device 110, the SE device 110 may be joined and utilized on the SE network 135, thus configuring the SE network 135.

Figure 4:
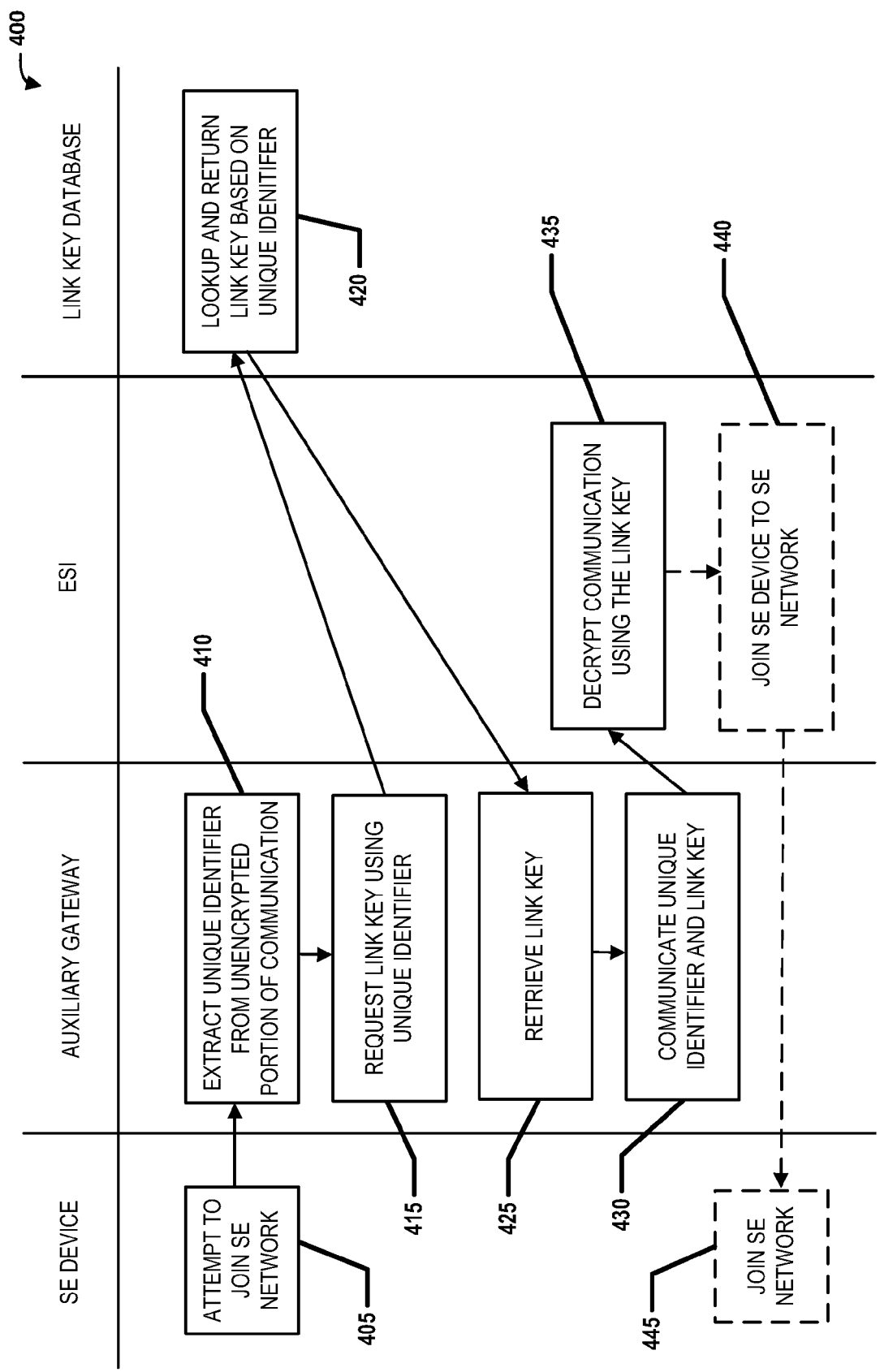
FIG. 4 illustrates a swim-lane flowchart for an example method to lookup a smart energy device's link key by an auxiliary gateway and communicate the link key to an energy services interface.

FIG. 4 illustrates a swim-lane flowchart for an example method 400 to lookup a smart energy device's link key by an auxiliary gateway and communicate the link key to an energy services interface. Various components from system 100, shown in FIG. 1, may be used to implement the method 400 and components from system 100 are used here for illustrative purposes.

At 405 a SE device 110 attempts to join a SE network 135. In various embodiments the SE device 110 may broadcast a beacon, or employ another method of the underlying network infrastructure supporting the SE device's 110 connectivity to the SE network 135 to communicate a request to join the SE network 135. In various embodiments the communication may be encrypted using the SE device's 110 link key 215. In various embodiments the encrypted communication is partially unencrypted, such as, for example, the packet headers of one or more underlying network protocols. In various embodiments the unencrypted portion of the communication contains a unique identifier 210 for the SE device 110, such as, for example, a MAC address for the SE device 110.

At 410 the auxiliary gateway 105, having received the communication from the SE device 110 to join the SE network 135, extracts the SE device's 110 unique identifier 210 from an unencrypted portion of the communication. In another embodiment, the ESI 115 may receive the communication from the SE device 110 and extract the SE device's 110 unique identifier 210. The ESI 115 may then communicate the unique identifier 210 to the auxiliary gateway 105. In other embodiments the unique identifier 210 may be communicated to the auxiliary gateway 105 by a request from the ESI 115 for a link key 215.

At 415 the auxiliary gateway 105 may request the link key 215 for the SE device 110 from the link key database 120 using the unique identifier 210. In various embodiments the auxiliary gateway 105 may query the link key database 120 using, for example, structured query language ("SQL") statements, or may use other interfaces, such as a web services interface, to interact with the link key database 120.

At 420 the link key database 120 retrieves the link key 215 that maps to the unique identifier 210. The link key database 120 may then return the link key 215 to the auxiliary gateway 105.

At 425 the auxiliary gateway 105 receives the link key 215. In various embodiments the auxiliary gateway 105 may store the unique identifier 210 and the link key 215 in order to facilitate future communications with the SE device 110.

At 430 the auxiliary gateway 105 may communicate the link key 215 to the ESI 115. In various embodiments the auxiliary gateway 105 may initiate the communication and transmit the link key 215 to the ESI 115. In other embodiments the auxiliary gateway 105 may transmit a notification to the ESI 115 indicating that the link key 215 has been acquired by the auxiliary gateway 105. In various embodiments the communication may be initiated by the ESI 115 by, for example, polling the auxiliary gateway 105.

At 435 the ESI 115 may use the link key 215 received from the auxiliary gateway 105 to decrypt the SE device 110 communication to join the SE network 135. In various embodiments the ESI 115 may also receive information, such as the unique identifier 210 that may be used to associate the link key 215 with the SE device 110. In various embodiments the ESI 115 may store the unique identifier 210 and the link key 215 in order to facilitate future communications with the SE device 110. In various embodiments the auxiliary gateway 105 may act as a second ESI to perform 435.

At 440 the ESI 115, in some embodiments, may join the SE device 110 to the SE network 135 after the SE device's communication has been decrypted. In various embodiments the ESI 115 may provide the SE device 110 with a NetKey, different than the link key, to encrypt future communications. In various embodiments the auxiliary gateway 105 may act as a second ESI to perform 440.

At 445 the SE device 110 completes the SE network 135 joining process. In various embodiments the SE device 110 exchanges certificates with the ESI 115 to complete the joining process. In various embodiments, where the auxiliary gateway 105 performs as a second ESI, the SE device 110 may complete the joining process with the auxiliary gateway 105. In various embodiments the SE device 110 may exchange certificates with the auxiliary gateway 105.

Method 400 may be repeated for each SE device 110 attached to the SE network 135 at any time. For example, if a home had four SE devices installed initially, a thermostat, a water meter, a gas meter, and an electricity meter, each SE device, once activated, may be joined to the SE network 135 by the ESI 115 using the auxiliary gateway 105 without further intervention by the human installer. Additionally, if, for example, the thermostat was not installed initially, it may be added at a later date and join the SE network 135 in the same manner described above without additional work by the human installer.

Figure 5:
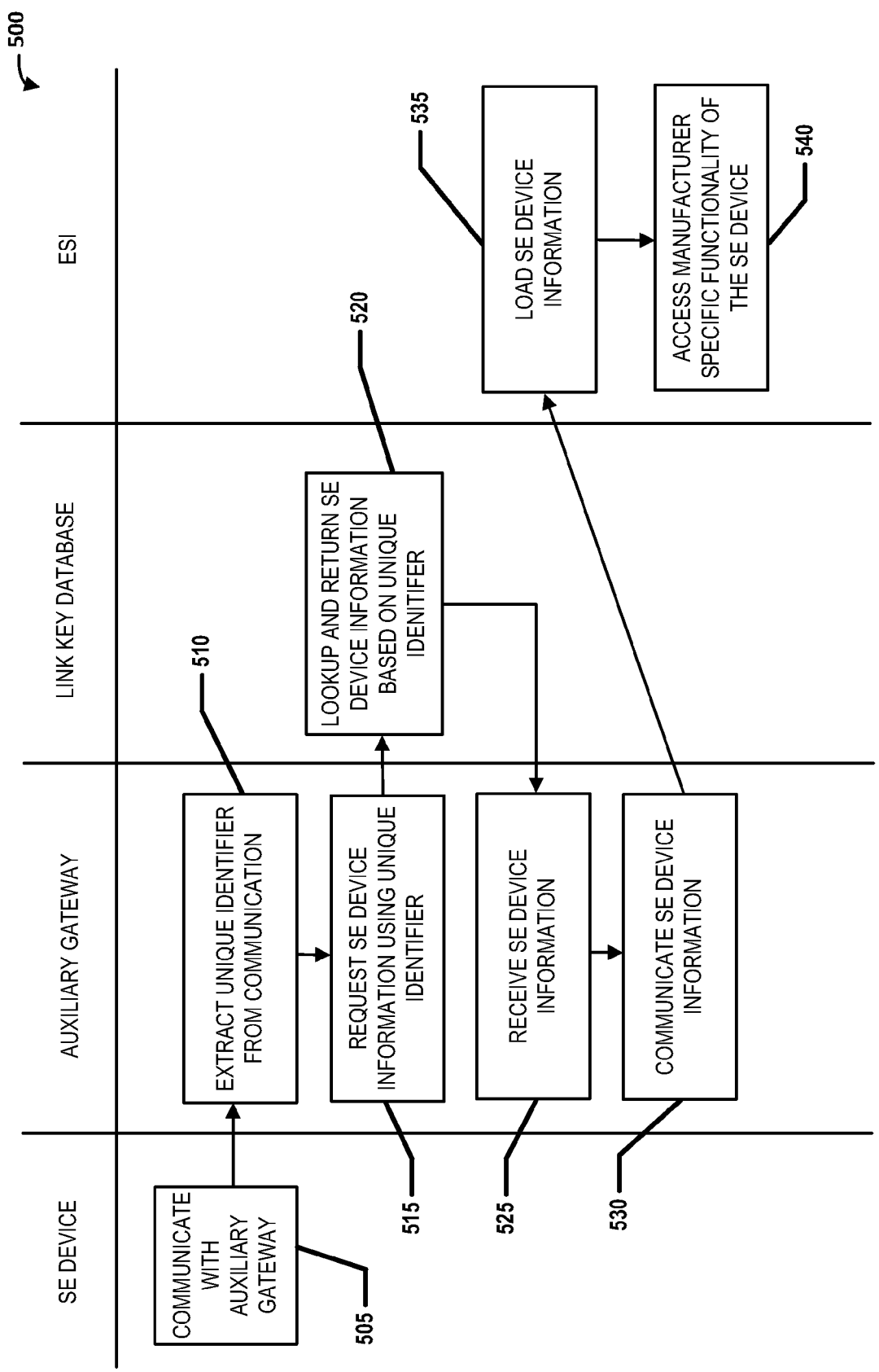
FIG. 5 illustrates a swim-lane flowchart for an example method to lookup a smart energy device's information by an auxiliary gateway and communicate the information to an energy services interface.

FIG. 5 illustrates a swim-lane flowchart for an example method 500 to lookup a smart energy device's information by an auxiliary gateway and communicate the information to an energy services interface. Various components from system 100, shown in FIG. 1, may be used to implement the method 500 and components from system 100 are used here for illustrative purposes.

At 505 a SE device may communicate with an auxiliary gateway 105. In some embodiments the communication may be part of the SE device's 110 attempt to join a SE network 135. In other embodiments, the communication may be subsequent to the joining of the SE device 110 to the SE network 135. In various embodiments the communication may be encrypted. In other embodiments the communication may be unencrypted.

At 510 the auxiliary gateway 105 may extract a unique identifier 210 for the SE device 110 from the communication. In various embodiments the auxiliary gateway 105 may be able to extract the unique identifier 210 from an unencrypted portion of an encrypted communication that the auxiliary gateway 105 may not be able to decrypt. In other embodiments, the auxiliary gateway 115 may extract the unique identifier 210 from any portion of the communication if the communication is unencrypted or the ESI 115 has decrypted the communication. In various embodiments the ESI 115 may determine the unique identifier 210 from the communication and communicate it to the auxiliary gateway 105. In other embodiments the unique identifier 210 may be communicated to the auxiliary gateway 105 by a request from the ESI 115 for SE device information 205.

At 515 the auxiliary gateway 105 may request SE device information 205 for the SE device 110. In various embodiments the SE device information 205 may include the link key 215 for the SE device 110. In various embodiments the SE device information 205 may include device information 220 in addition to the link key 215. In various embodiments the device information 220 may include a driver, or MSP extensions, of the SE device 110. In various embodiments the auxiliary gateway 105 may request only a portion of the SE device information 205.

At 520 the link key database 120 may retrieve all, or a portion of, the SE device information 205 that maps to the SE device's 110 unique identifier 210 and return it to the auxiliary gateway 105.

At 525 the auxiliary gateway 105 may receive and load the SE device information 205 returned by the link key database 120. In various embodiments the auxiliary gateway 105 may load and use the SE device information 205. For example, if the returned SE device information 205 is a driver for the SE device 110, the auxiliary gateway 105 may load the driver and use it to utilize MSP extensions of the SE device 105 to achieve greater functionality than may be possible with a standard SE device of a given type.

At 530 the auxiliary gateway 105 may communicate the SE device information 205 to the ESI 115. In various embodiments the auxiliary gateway 105 may initiate the communication and transmit the SE device information 205 to the ESI 115. In other embodiments the auxiliary gateway 105 may transmit a notification to the ESI 115 indicating that SE device information 205 has been acquired by the auxiliary gateway 105. In various embodiments the communication may be initiated by the ESI 115 by, for example, polling the auxiliary gateway 105.

At 535 the ESI 115 may load the SE device information 205 from the auxiliary gateway 105. In various embodiments the ESI 115 may also receive information, such as the unique identifier 210 that may be used to associate the SE device information 205 with the SE device 110. In various embodiments the ESI 115 may store the unique identifier 210 and the SE device information 205 in order to facilitate future communications with the SE device 110.

At 540 the ESI 115 may use the SE device information 205 to access manufacturer specific functionality for the SE device 110. For example, if the returned SE device information 205 is a driver 225 for the SE device 110, the ESI 115 may load the driver 225 and use it to utilize MSP extensions of the SE device 105 to achieve greater functionality than may be possible with a standard SE device of a given type.

The burden on those installing SE networks may be reduced by using an auxiliary gateway that can connect to the link key database and determine configuration parameters, such as SE device link keys and drivers, for the SE network, and communicate the configuration parameters with an ESI. The installer is relieved from manual entry of probably long and cryptic information for each SE device attached to the SE network.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An auxiliary gateway capable of communicating with an energy services interface (ESI) and a link key database, the auxiliary gateway configured to:
   receive a communication derived from an original communication originating from a smart energy (SE) device;
   determine a unique identifier of the SE device from an unencrypted portion of the original communication;
   retrieve information about the SE device from the link key database using the unique identifier; and
   communicate the information to the ESI, the information arranged to facilitate communication between the ESI and the SE device.

2. The auxiliary gateway of claim 1, wherein the communication is an encrypted request to join a SE network from the SE device.

3. The auxiliary gateway of claim 1, wherein the communication is a request from the ESI for the information; and
   wherein to determine the unique identifier includes reading the unique identifier from the request.

4. The auxiliary gateway of claim 1, wherein the unique identifier is a media access control (MAC) address of the SE device.

5. The auxiliary gateway of claim 1, wherein the information associated with the SE device includes a link key associated with the SE device;
   wherein the link key is a symmetric key installed on the SE device; and
   wherein the link key is used to secure communications with the SE device while the SE device attempts to join a SE network.

6. The auxiliary gateway of claim 5, wherein the ESI is configured to join the SE device to the SE network using the link key.

7. The auxiliary gateway of claim 5, wherein the auxiliary gateway is configured to join the SE device to the SE network using the link key.

8. The auxiliary gateway of claim 1, wherein the information associated with the SE device includes a driver for the SE device, the driver enabling the ESI to use at least one manufacturer specific profile (MSP) extension of the SE device.

9. The auxiliary gateway of claim 1, wherein the auxiliary gateway is a second ESI.

10. The auxiliary gateway of claim 1, wherein the auxiliary gateway is part of a second SE device previously joined to a SE network.

11. A system comprising:
a link key database configured to map a unique identifier of a smart energy (SE) device to information about the SE device;
an energy services interface (ESI); and
an auxiliary gateway capable of communicating with ESI and the link key database, the auxiliary gateway configured to:
receive a communication derived from an original communication originating from the SE device;
determine the unique identifier from an unencrypted portion of the original communication;
retrieve the information from the link key database using the unique identifier; and
communicate the information to the ESI, the information arranged to facilitate communication between the ESI and the SE device.

12. A system comprising:
a smart energy (SE) device, the SE device having a unique identifier and configured to transmit an original communication;
a link key database including information about the SE device, the information including the unique identifier;
an energy services interface (ESI); and
an auxiliary gateway capable of communicating with the ESI and the link key database, the auxiliary gateway configured to:
receive a communication derived from the original communication;
determine the unique identifier from an unencrypted portion of the communication;
retrieve the information from the link key database using the unique identifier; and
communicate the information to the ESI, the information arranged to facilitate communication between the ESI and the SE device.

13. In a system having an auxiliary gateway capable of communicating with an energy services interface (ESI) and a link key database, a method of provisioning a Smart Energy (SE) device, the method comprising:
receiving, by the auxiliary gateway, a communication derived from an original communication originating from the SE device;
determining a unique identifier of the SE device from an unencrypted portion of the original communication;
retrieving information about the SE device from the link key database using the unique identifier;
communicating the information to the ESI; and
using, by the ESI, the information to communicate with the SE device.

14. The method of claim 13, wherein the communication is an encrypted request to join a SE network from the SE device.

15. The method of claim 13, wherein the communication is a request from the ESI for the information; and
wherein determining the unique identifier includes reading the unique identifier from the request.

16. The method of claim 13, wherein the unique identifier is a media access control (MAC) address of the SE device.

17. The method of claim 13, wherein the information associated with the SE device includes a link key associated with the SE device;
wherein the link key is a symmetric key installed on the SE device; and
wherein the link key is used to secure communications with the SE device while the SE device attempts to join a SE network.

18. The method of claim 17, further comprising joining the SE device to the SE network using the ESI, wherein joining includes transferring information between the SE device and the ESI, wherein the information is encrypted using the link key.

19. The method of claim 17, further comprising joining the SE device to the SE network using the auxiliary gateway, wherein joining includes transferring information between the SE device and the auxiliary gateway, wherein the information is encrypted using the link key.

20. The method of claim 13, wherein the information associated with the SE device includes a driver for the SE device, the driver enabling the ESI to use at least one manufacturer specific profile (MSP) extension of the SE device.

21. The method of claim 13, wherein the auxiliary gateway is a second ESI.

22. The method of claim 13, wherein the auxiliary gateway is part of a second SE device previously joined to a SE network.

* * * * *